(12) United States Patent
Smith et al.

(10) Patent No.: US 11,092,727 B2
(45) Date of Patent: Aug. 17, 2021

(54) HIGH-RESOLUTION SINGLE PHOTODIODE SPECTROMETER USING A NARROWBAND OPTICAL FILTER

(71) Applicant: VIAVI Solutions Inc., San Jose, CA (US)

(72) Inventors: Valton Smith, Daly City, CA (US); Curtis R. Hruska, Cloverdale, CA (US)

(73) Assignee: VIAVI Solutions Inc., San Jose, CA (US)

( * ) Notice: Subject to any disclaimer, the term of this patent is extended or adjusted under 35 U.S.C. 154(b) by 580 days.

(21) Appl. No.: 16/024,334

(22) Filed: Jun. 29, 2018

(65) Prior Publication Data

US 2020/0003940 A1  Jan. 2, 2020

(51) Int. Cl.
*G01J 3/28* (2006.01)
*G02B 5/28* (2006.01)
*G01J 3/12* (2006.01)
*G02B 6/12* (2006.01)

(52) U.S. Cl.
CPC ............ *G02B 5/285* (2013.01); *G01J 3/2803* (2013.01); *G02B 5/281* (2013.01); *G01J 2003/1226* (2013.01); *G02B 2006/12109* (2013.01)

(58) Field of Classification Search
CPC .... G02B 5/28–289; G02B 2006/12109; G02B 26/001; G02B 26/0833–0866
USPC .................................................. 359/577–590
See application file for complete search history.

(56) References Cited

U.S. PATENT DOCUMENTS

| | | | |
|---|---|---|---|
| 9,377,396 B2 | 6/2016 | Goldring et al. | |
| 2005/0012925 A1* | 1/2005 | Saptari | G01J 3/2889 |
| | | | 356/319 |
| 2011/0109905 A1* | 5/2011 | Martin | G01J 3/02 |
| | | | 356/326 |

FOREIGN PATENT DOCUMENTS

| | | |
|---|---|---|
| CN | 107238570 A | 10/2017 |
| JP | H07128231 A | 5/1995 |
| WO | 2005005940 A1 | 1/2005 |
| WO | 2010002326 A1 | 1/2010 |

OTHER PUBLICATIONS

Extended European Search Report for Application No. EP19180369. 1, dated Nov. 25, 2019, 7 pages.
IDEX Health & Science, Semrock, "Notch Filter Spectra vs. Angle of Incidence", https://www.semrock.com/TN_Notch_SpectrumvsAOI. aspx, Retrieved Jun. 29, 2018, 3 pages.

* cited by examiner

*Primary Examiner* — Ryan S Dunning
(74) *Attorney, Agent, or Firm* — Harrity & Harrity, LLP

(57) ABSTRACT

An optical device may include a narrowband optical filter to receive a beam of light at a selected angle of incidence, wherein the beam of light is caused to be received by the narrowband optical filter at the selected angle of incidence by a steering element included in the optical device, and output a filtered beam of light associated with the beam of light, wherein a wavelength of the filtered beam of light depends on the selected angle of incidence of the beam of light on the narrowband optical filter. The optical device may include a photodiode to receive at least a portion of the filtered beam of light after the filtered beam of light is outputted by the narrowband optical filter.

21 Claims, 6 Drawing Sheets

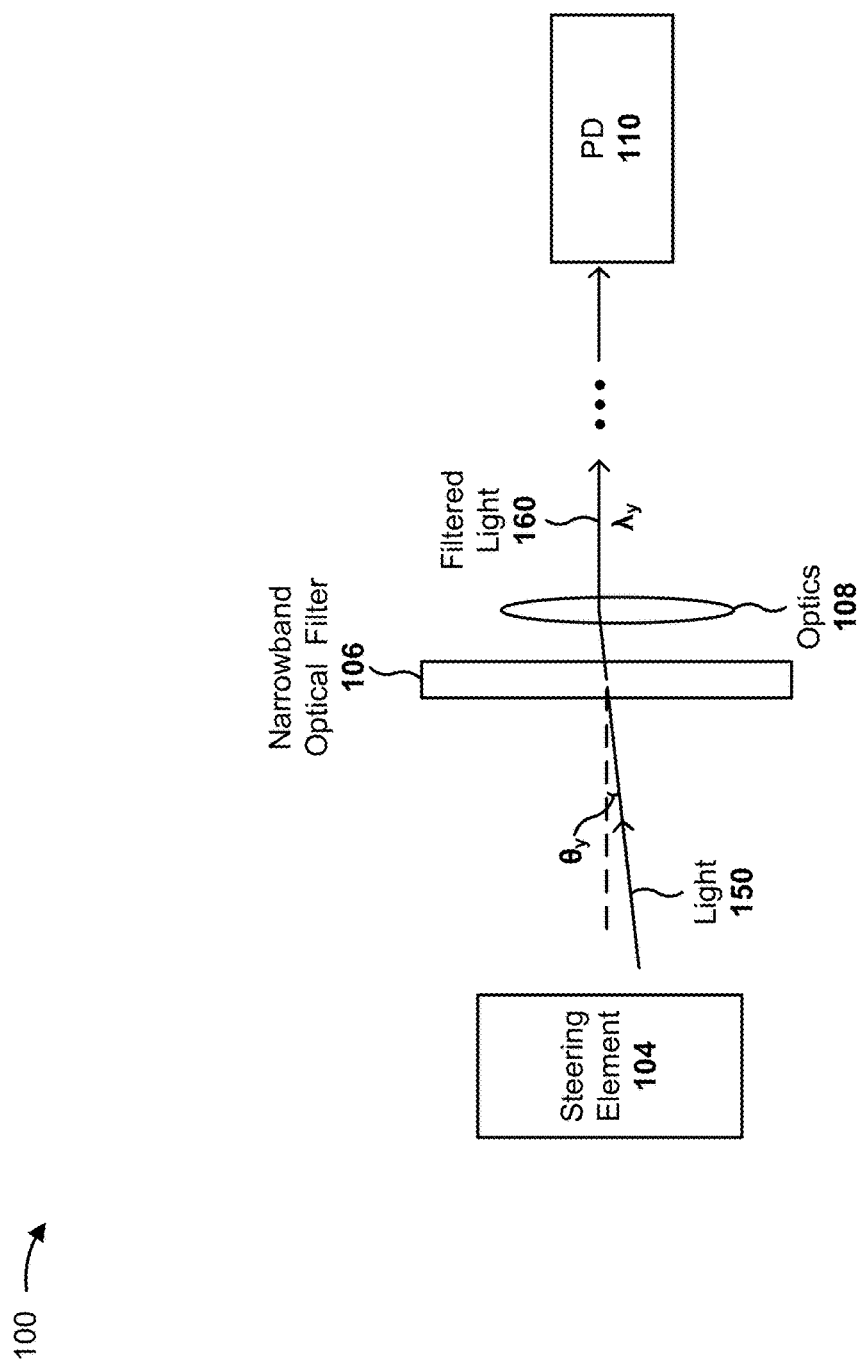

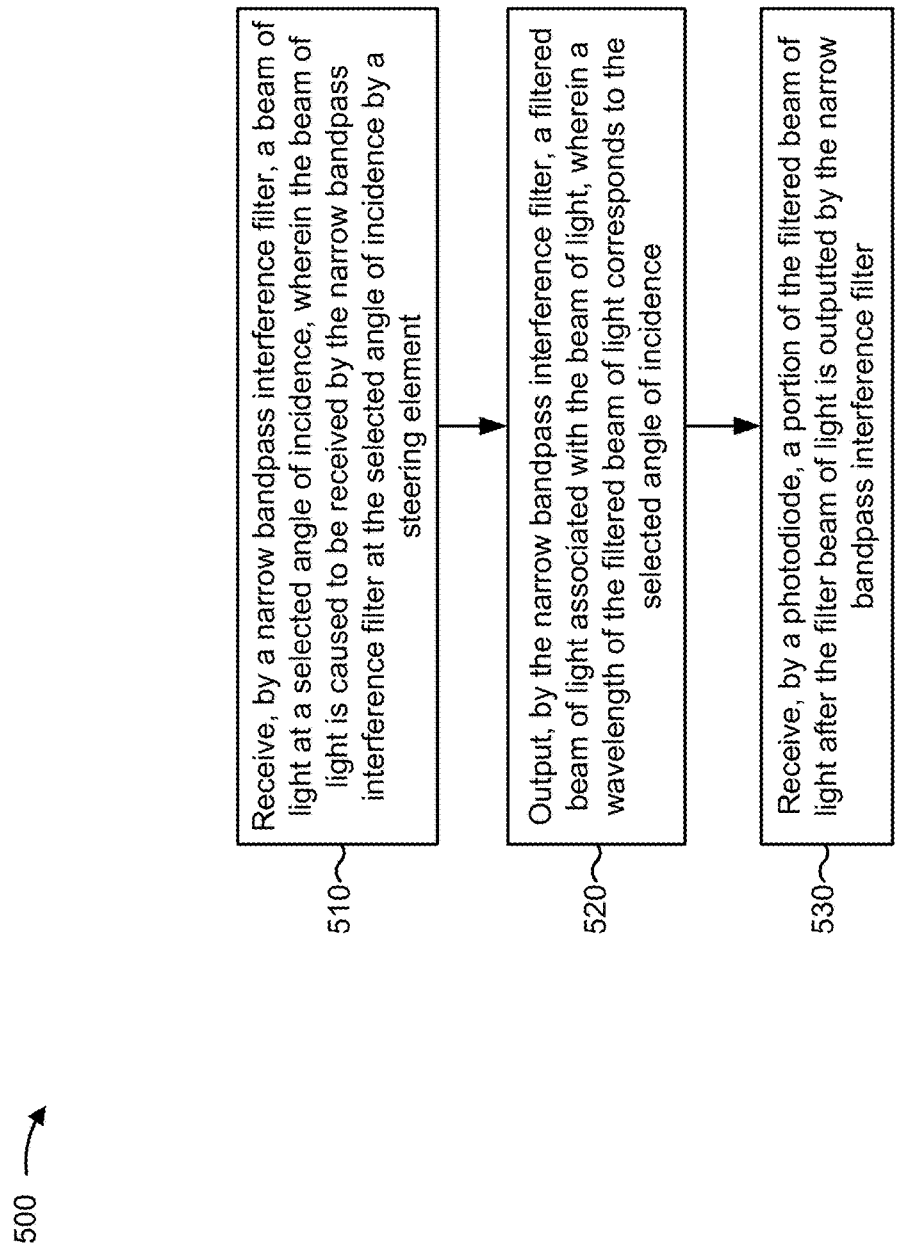

HIGH-RESOLUTION SINGLE PHOTODIODE SPECTROMETER USING A NARROWBAND OPTICAL FILTER

BACKGROUND

An optical filter is a device that filters light, incident on the optical filter, based on wavelength. For example, a bandpass interference filter (herein referred to as a bandpass filter) may transmit light in a particular range of wavelengths, while rejecting (e.g., absorbing or reflecting) light at wavelengths that fall outside of (i.e., above or below) the particular range of wavelengths. Bandpass filters can be used in a variety of applications, such as fluorescence microscopy, spectroscopy, clinical chemistry, imaging, and many others.

SUMMARY

According to some possible implementations, an optical device may include: a narrowband optical filter to: receive a beam of light at a selected angle of incidence, wherein the beam of light is caused to be received by the narrowband optical filter at the selected angle of incidence by a steering element included in the optical device; and output a filtered beam of light associated with the beam of light, wherein a wavelength of the filtered beam of light depends on the selected angle of incidence of the beam of light on the narrowband optical filter; and a photodiode to receive at least a portion of the filtered beam of light after the filtered beam of light is outputted by the narrowband optical filter.

According to some possible implementations, a method may include: receiving, by a narrowband optical filter included in an optical device, a beam of light at a selected angle of incidence, wherein the beam of light is caused to be received by the narrowband optical filter at the selected angle of incidence by a steering element included in the optical device; outputting, by the narrowband optical filter, a filtered beam of light associated with the beam of light, wherein a wavelength of the filtered beam of light is governed by the selected angle of incidence; and receiving, by a photodiode included in the optical device, a portion of the filtered beam of light after the filter beam of light is outputted by the narrowband optical filter.

According to some possible implementations, a spectrometer may include: a steering element to direct a beam of light such that the beam of light is incident on a narrowband optical filter at a particular angle of incidence; the narrowband optical filter to filter the beam of light in order to create filtered beam of light, wherein a wavelength of the filtered beam of light depends on the particular angle of incidence; and a photodiode to receive at least a portion of the filtered beam of light in association with performance of a spectroscopic measurement.

BRIEF DESCRIPTION OF THE DRAWINGS

FIGS. 1A and 1B are diagrams of an example optical device that includes a single photodiode and a narrowband optical filter, where an angle of incidence of a beam of light on the narrowband optical filter is controlled by a steering element of the optical.

FIG. 5 is a flow chart of an example process for using an optical device, described herein.

DETAILED DESCRIPTION

Figure 1A:
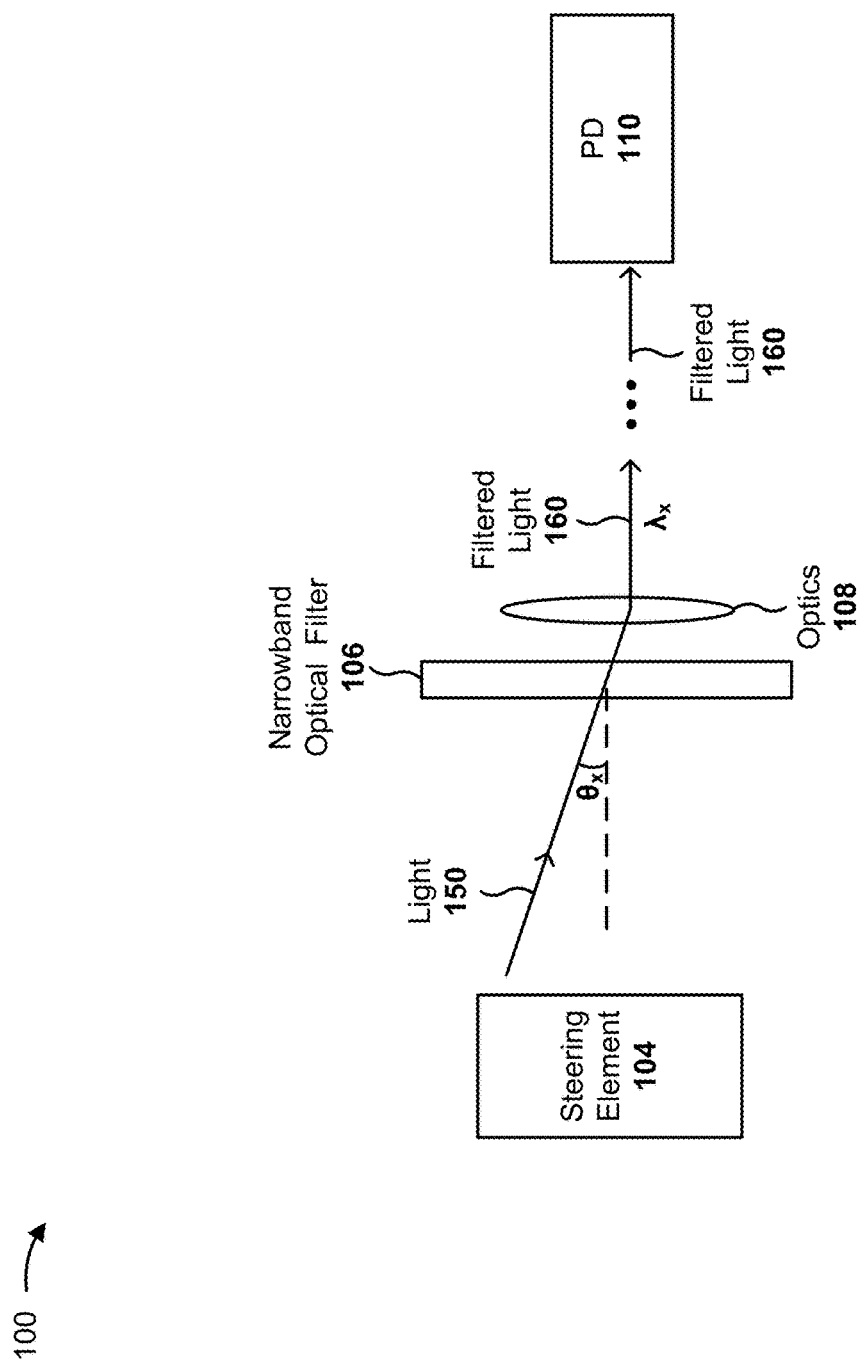

The following detailed description of example implementations refers to the accompanying drawings. The same reference numbers in different drawings may identify the same or similar elements.

A spectrometer is an optical device that can be used to collect spectral data relating to one or more wavelengths of light (e.g., based on an intensity of a given wavelength of light at a sensor element of the spectrometer). Some spectroscopic applications, such as some near infrared (NIR) applications, require collection of spectral data within a relatively narrow wavelength range (e.g., a wavelength range that is less than approximately 100 nanometers (nm) in width). For example, in an asbestos detection application, the spectrometer may be required to collect spectral data across a wavelength range that is approximately 50 nm to 60 nm in width. Collection of spectral data across such relatively narrow wavelength ranges may be difficult to accomplish with a typical spectrometer, such as a spectrometer that uses linear variable filter (LVF) technology or diffraction grating technology, due to limitations of these technologies.

However, even if collection of spectral data in a relatively narrow wavelength range is possible using the typical spectrometer, such a spectrometer requires an array of photodiodes (e.g., a one-dimensional array, a two-dimensional array) in order to collect the spectral data. There are a number of issues with these typical spectrometers.

One such issue is that photodiodes that are sensitive in a wavelength range of interest for a given application, such as indium gallium arsenide (InGaAs) detectors that are sensitive in a NIR range, can be quite expensive. Thus, it is desirable to keep the number of photodiodes in the spectrometer as small as possible (e.g., in order to reduce a cost of the spectrometer). Further, an array of photodiodes can be relatively large and bulky (e.g., as compared to a single photodiode). As such, miniaturizing the spectrometer may be difficult and/or impossible when multiple photodiodes are required.

Another issue is that high optical resolution is needed in some applications (e.g., asbestos detection in a NIR application). However, it may be difficult and/or impossible to reduce a bandwidth of a dispersing element (e.g., a LVF) in order to achieve a desired optical resolution using typical technologies.

Yet another issue is that using a filter-based spectrometer typically does not allow wavelengths for which spectral data is recorded (by a given photodiode) to be selected and/or modified. For example, in some typical spectrometers, a LVF is at a fixed location above an array of photodiodes and, as such, each photodiode can collect spectral data associated with a predetermined wavelength.

Still another issue is that a typical spectrometer with an array of photodiodes uses only one integration time, applied to all photodiodes, for a single acquisition. However, an optimal integration time for a given individual wavelength depends on a number of factors (e.g., responsivity of a photodiode, transmission of an optical filter, an optical setup, and/or the like). As such, applying only one integration time for all wavelengths is not optimal and/or may negatively impact performance of the device.

Some implementations described herein provide a spectrometer that includes a single photodiode and a narrowband optical filter, where an angle of incidence of a beam of light (e.g., a collimated light source) on the narrowband optical filter is controlled by a steering element, thereby determining a wavelength of light transmitted by the narrowband optical filter to or from a sample and into the single photodiode.

In some implementations, the narrowband optical filter may be an ultra-narrow bandpass interference (UNBP) filter (e.g., with a bandwidth of a few nanometers or less) or a narrow bandpass interference (NBP) filter (e.g., with a bandwidth from a few nanometers to a few tens of nanometers).

Inclusion of a single photodiode (e.g., rather than an array of photodiodes) in the spectrometer reduces cost of the spectrometer (e.g., as compared to the typical spectrometer that includes an array of photodiodes, as described above). For example, an amount of photoactive material used in a single photodiode is a fraction of that used in an array of photodiodes, thereby reducing cost. Additionally, inclusion of a single photodiode allows a size of the spectrometer to be reduced (e.g., as compared to a spectrometer that includes an array of photodiodes).

Additionally, the use of a narrowband optical filter (e.g., a UNBP filter) allows optical resolution of the spectrometer to be improved (e.g., as compared to the typical spectrometer described above). For example, the steering element may include a micro-electro-mechanical system (MEMS) mirror that can be used to select a narrow wavelength of a light source (e.g., a light emitting diode (LED)) by adjusting an angle of incidence of the light source on the narrowband optical filter in order to adjust a peak-transmission wavelength of the narrowband optical filter.

Further, the use of the steering element (e.g., a MEMS mirror) in combination with the narrowband optical filter (e.g., a UNBP filter) allows greater flexibility in wavelength selection for acquisition improved (e.g., as compared to the typical spectrometer described above). For example, instead of having a set number of predetermined wavelengths associated with an array of photodiodes, which and how many wavelengths to acquire can be selected (e.g., as long as the selected wavelengths are within a wavelength range supported by the UNBP filter).

Additionally, the inclusion of a single photodiode allows for flexible integration times to be used in association with different wavelengths (e.g., as compared to using one integration time, applied across all photodiodes in a photodiode array), which may act as a gain-flattener and/or otherwise improve performance of the spectrometer.

Notably, while the techniques and apparatuses described herein are described as being used in a spectrometer, these techniques and apparatuses may be used in other types of optical devices, such as another type of optical sensor, an optical device that serves as an illumination source (e.g., for use in a fluorescence application), and/or like.

FIGS. 1A and 1B are diagrams of an optical device 100 that includes a single photodiode and a narrowband optical filter, where an angle of incidence of a beam of light on the narrowband optical filter is controlled by a steering element of optical device 100. In some implementations, optical device 100 may be a spectrometer or another type of optical sensor.

As shown in FIG. 1A, optical device 100 may include steering element 104, narrowband optical filter 106, optics 108, and a photodiode (PD) 110. Elements of optical device 100 are described first, followed by a description of operation of optical device 100.

Steering element 104 includes an element that causes a beam of light 150, propagating in optical device 100, to be incident on narrowband optical filter 106 at a selected angle of incidence. In other words, in some implementations, steering element 104 selects, controls, or otherwise dictates the angle at which beam of light 150 is incident on narrowband optical filter 106. For example, in some implementations, steering element 104 may include a tiltable MEMS mirror and a set of curved reflective optical elements (e.g., a concave elliptical mirror, one or more curved mirrors, and/or the like) as described below with regard to FIGS. 2 and 3. As another example, steering element 104 may include an emitter arranged to emit a light at a particular angle with respect to narrowband optical filter 106, as described below with regard to FIG. 4.

Narrowband optical filter 106 includes an optical filter, such as a UNBP filter (e.g., an optical filter with a bandwidth of a few nanometers, such as approximately 0.5 nm), a NBP filter (e.g., an optical filter with a bandwidth from a few nanometers to a several tens of nanometers, such as 20 nm, 50 nm, and/or the like), and/or the like. In some implementations, narrowband optical filter 106 may be designed to or may include a coating (e.g., a thin film coating) designed to preserve a bandpass shape of narrowband optical filter 106, even at relatively high angles of incidence (e.g., angles of incidence that are greater than approximately 30° from normal, such as a 45° angle of incidence from normal or more). For example, narrowband optical filter 106 may include a coating comprising hydrogenated silicon, in some implementations. As another example, narrowband optical filter 106 may be designed with a polarization tunable property (e.g., based on selection of coating materials and/or deposition techniques), that allows angles of incidence of greater than 45° from normal to be used, while retaining acceptable slide-band performance).

In some implementations, a wavelength of light transmitted by narrowband optical filter 106 (e.g., a filtered beam of light 160 to be propagated on an optical path toward PD 110), depends on an angle of incidence of beam of light 150 on narrowband optical filter 106. This is due to a wavelength shift property of interference filters. The wavelength shift property of an interference filter, such as narrowband optical filter 106, is a function of an angle of incidence of light incident thereon, meaning that a wavelength (e.g., a peak transmission wavelength) of filtered beam of light 160, transmitted by narrowband optical filter 106, depends on the angle of incidence of beam of light 150. As described herein, an optical sensor, such as a spectrometer, can be created based on the angle-shifting property of narrowband optical filter 106. For example, since the angle of incidence of beam of light 150 on narrowband optical filter 106 determines a wavelength of filtered beam of light 160, specific wavelengths can be selected by controlling the incident angle (e.g., using steering element 104). An optical resolution of such an optical sensor is governed by a spectral profile of narrowband optical filter 106. Thus, when narrowband optical filter 106 is a UNBP filter, or even a NBP filter, optical resolution can be very high (e.g., a UNBP filter can have a spectral bandwidth down to approximately 0.02% of a center wavelength). Additionally, a spectral range of the optical sensor is governed by particular angle shift properties of narrowband optical filter 106 (e.g., a material of a substrate, a material of a thin film coated on the substrate, and/or the like) with respect to an angle of incidence.

Optics 108 includes an element to focus and/or direct filtered beam of light 160, transmitted by narrowband optical filter 106, such that filtered beam of light 160 is received at PD 110 for the collection of spectral data. For example, in some implementations, optics 108 may include a set of lenses (e.g., a circular lens), a set of prisms (e.g., a wedge prism), a light pipe, and/or another type of optical element(s) for focusing and/or directing light propagating in free-space.

PD 110 includes a photodiode capable of collecting spectral data associated with a wavelength of filtered beam of light 160 (e.g., a portion of beam of light 150 that passes narrowband optical filter 106). In some implementations, PD 110 may be arranged to receive at least a portion of filtered beam of light 160.

At a first time of operation, as shown in FIG. 1A, steering element 104 steers beam of beam of light 150, which is propagating in optical device 100. In some implementations, beam of light 150 may be a portion of a beam of light emitted by an emitter included in (or separate from) optical device 100 (not shown). For example, in some implementations, beam of light 150 may be a beam of light that interacts with (e.g., is reflected by or transmitted by) a sample for which spectral data is to be collected (e.g., beam of light 150 may have been reflected or transmitted by the sample before being steered by steering element 104). Alternatively, beam of light 150 may be a beam of light that is to be provided to the sample for which spectral data is to be collected (e.g., beam of light 150 may not yet have interacted with the sample before being steered by steering element 104).

As further shown in FIG. 1A, at a first time during operation, steering element 104 may steer beam of light 150 such that beam of light 150 is incident on narrowband optical filter 106 at angle $\theta_x$. In other words, steering element 104 causes beam of light 150 to be received by narrowband optical filter 106 at a selected angle of incidence.

As further shown, narrowband optical filter 106 may send filtered beam of light 160 having wavelength $\lambda_x$ (e.g., a portion of beam of light 150 that passes narrowband optical filter 106 when beam of light 150 is incident on narrowband optical filter 106 at angle $\theta_x$) toward optics 108. Here, as described above, the wavelength of filtered beam of light 160 depends on the selected angle of incidence of beam of light 150 on narrowband optical filter 106.

As further shown, optics 108, having received filtered beam of light 160 from narrowband optical filter 106, may focus and/or direct filtered beam of light 160 on an optical path toward PD 110. In some implementations, when optical device 100 is configured such that filtered beam of light 160 is to interact with (e.g., be reflected by or transmitted by) a sample, a portion of filtered beam of light 160 may be received at PD 110 (e.g., after interaction of filtered beam of light 160 with the sample). Alternatively, when optical device 100 is configured such that beam of light 150 interacts with the sample before being received by narrowband optical filter 106, filtered beam of light 160 may be directed to PD 110. In either case, as further shown in FIG. 1A, PD 110 may receive at least a portion of filtered beam of light 160, and may collect spectral data associated with $\lambda_x$, accordingly.

As shown in FIG. 1B, at a second (e.g., later) time of operation, steering element 104 may cause beam of light 150 to be incident on narrowband optical filter 106 at another angle (e.g., $\theta_y$, which is different from angle $\theta_x$), thereby causing filtered beam of light 160 to have another wavelength (e.g., $\lambda_y$, which is different from wavelength $\lambda_x$). Here, optical device 100 may operate in a similar manner to that described above, and may collect spectral data associated with $\lambda_y$, accordingly. In some implementations, elements of optical device 100 may be arranged such that beam of light 150 is incident on narrowband optical filter 106 at approximately a same location, regardless of an angle at which beam of light 150 is incident on narrowband optical filter 106.

In this way, optical device 100 may include a single PD 110 and narrowband optical filter 106, and an angle of incidence of beam of light 150 on narrowband optical filter 106 may be controlled by steering element 104, thereby determining a wavelength of light transmitted by narrowband optical filter 106 to or from a sample and into the single PD 110. As such, the benefits described above may be achieved by optical device 100.

As indicated above, FIGS. 1A and 1B are provided merely as examples. Other examples are possible and may differ from what was described with regard to FIGS. 1A and 1B.

Figure 2:
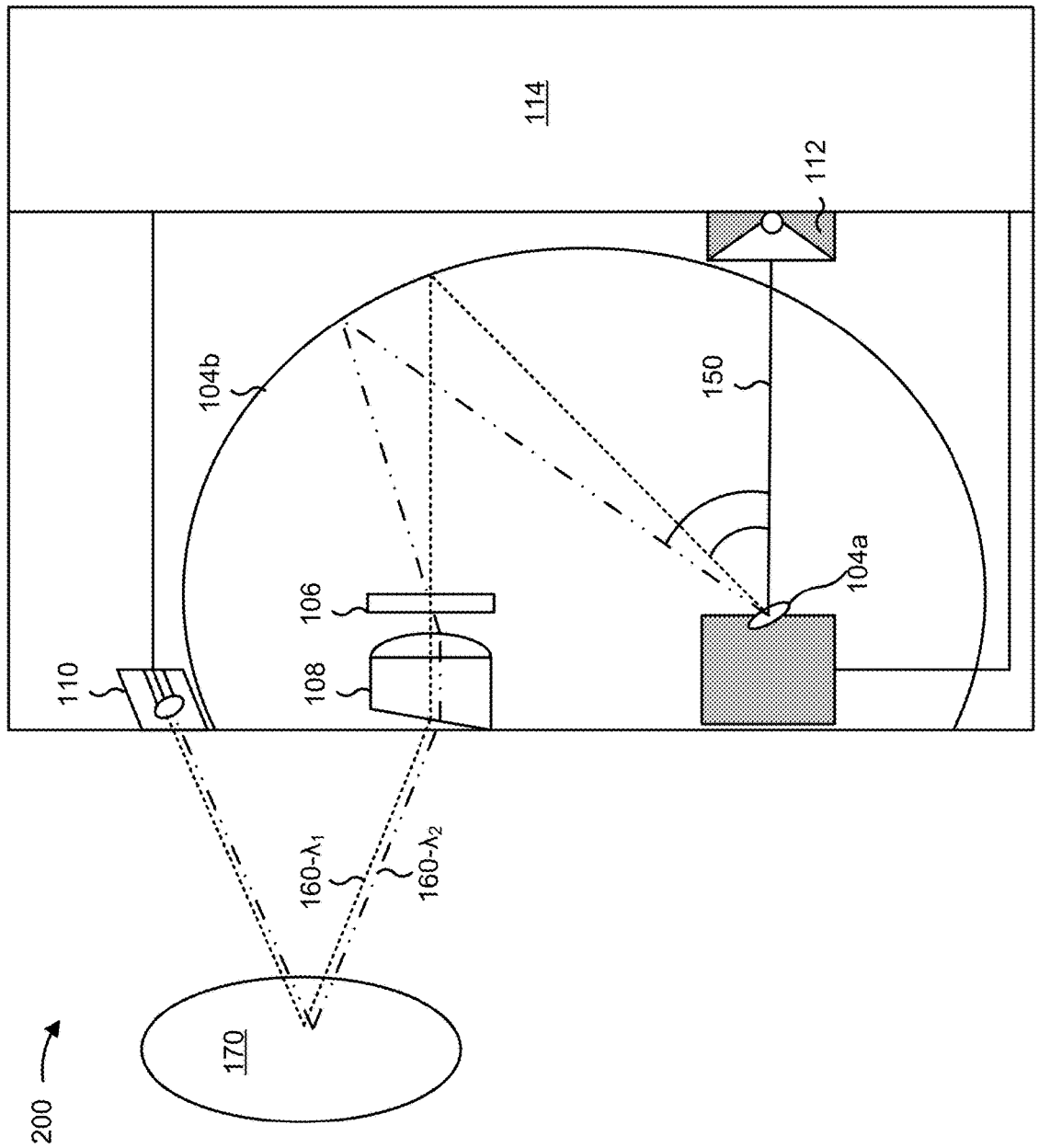
FIGS. 2-4 are diagrams of various example implementations of the optical device described with respect to FIGS. 1A and 1B.

FIG. 2 is a diagram of an example implementation 200 of optical device 100. As shown in FIG. 2, example implementation 200 of optical device 100 (herein referred to as optical device 200) includes steering element 104 (comprising MEMS mirror 104a and concave elliptical mirror 104b), narrowband optical filter 106, optics 108, PD 110, emitter 112, and electronics housing 114.

MEMS mirror 104a includes a tiltable or movable mirror arranged to reflect beam of light 150 (e.g., to concave elliptical mirror 104b). In some implementations, an angle at which MEMS mirror 104a reflects beam of light 150 is controlled based on an electrical signal received by MEMS mirror 104a (e.g., an electrical signal provided by one or more devices arranged in electronics housing 114). Thus, in some implementations, MEMS mirror 104a may act to select an angle of incidence at which beam of light 150 is incident on narrowband optical filter 106.

Concave elliptical mirror 104b includes a curved reflective optical element to direct beam of light 150 (e.g., after reflection by MEMS mirror 104a) to narrowband optical filter 106. In some implementations, MEMS mirror 104a and narrowband optical filter 106 may be arranged at foci of concave elliptical mirror 104b mirror. In some aspects, rather than or in addition to concave elliptical mirror 104b, optical device 100 may include one or more other curved reflective optical elements, such as one or more curved mirrors.

Emitter 112 includes an emitter to emit beam of light 150. For example, emitter 112 may include an LED configured to emit a collimated beam of light. As shown in FIG. 2, emitter 112 may be arranged to emit beam of light 150 to MEMS mirror 104a, in some implementations. In some implementations, emitter 112 may be controlled by one or more devices included in electronics housing 114.

At a first time of operation of optical device 200, assume that optical device 200 is to collect spectral data associated with wavelength $\lambda_1$. As shown in FIG. 2, emitter 112 emits beam of light 150 such that beam of light 150 is provided to MEMS mirror 104a. Here, as shown by the dotted line in FIG. 2, MEMS mirror 104a is tilted at an angle such that beam of light 150, after being reflected by concave elliptical mirror 104b, is incident on narrowband optical filter 106 at an angle that causes narrowband optical filter 106 to transmit filtered beam of light 160 comprising light at wavelength $\lambda_1$. This angle is shown as normal incidence in FIG. 2.

As further shown, narrowband optical filter 106 may filter beam of light 150 in order to create filtered beam of light 160 comprising light at wavelength $\lambda_1$ (herein referred to as filtered beam of light 160-$\lambda_1$), and may output filtered beam of light 160-$\lambda_1$ toward optics 108. Optics 108, having received filtered beam of light 160-$\lambda_1$ focuses and directs filtered beam of light 160-$\lambda_1$ toward a sample 170 (e.g., a sample for which spectral data is to be collected).

As further shown, sample 170 interacts with (e.g., reflects or transmits) filtered beam of light 160-$\lambda_1$ such that a portion of filtered beam of light 160-$\lambda_1$ is received at PD 110. PD 110 receives the portion of filtered beam of light 160-$\lambda_1$ and collects spectral data, accordingly. For example, PD 110 may provide an electrical signal, associated with an intensity of $\lambda_1$, to one or more devices included in (or external to) electronics housing 114.

As further shown in FIG. 2, at a second time of operation of optical device 200, optical device 200 may need to collect spectral data associated with wavelength $\lambda_2$. As shown in FIG. 2, emitter 112 emits beam of light 150 such that beam of light 150 is provided to MEMS mirror 104a. Here, as shown by the dashed and dotted line in FIG. 2, MEMS mirror 104a is tilted at an angle such that beam of light 150, after being reflected by concave elliptical mirror 104b, is incident on narrowband optical filter 106 at an angle that causes narrowband optical filter 106 to transmit filtered beam of light 160 comprising light at wavelength $\lambda_2$. This angle is shown as an angle other than normal incidence in FIG. 2.

As further shown, narrowband optical filter 106 may filter beam of light 150 in order to create filtered beam of light 160 comprising light at wavelength $\lambda_2$ (herein referred to as filtered beam of light 160-$\lambda_2$), and may output filtered beam of light 160-$\lambda_2$ toward optics 108. Optics 108, having received filtered beam of light 160-$\lambda_2$ focuses and directs filtered beam of light 160-$\lambda_2$ toward sample 170. Here, sample 170 interacts with (e.g., reflects or transmits) filtered beam of light 160-$\lambda_2$ such that a portion of filtered beam of light 160-$\lambda_2$ is received at PD 110. PD 110 receives the portion of filtered beam of light 160-$\lambda_2$ and collects spectral data, accordingly. For example, PD 110 may provide an electrical signal, associated with an intensity of $\lambda_2$, to one or more devices included in (or external to) electronics housing 114.

The number and arrangement of elements shown in FIG. 2 are provided as examples. In practice, there may be additional elements, fewer elements, different elements, or differently arranged elements than those shown in FIG. 2. Furthermore, two or more elements shown in FIG. 2 may be implemented within a single element, or a single element shown in FIG. 2 may be implemented as multiple, distributed elements.

In optical device 200, narrowband optical filter 106 is arranged to output filtered beam of light 160 to sample 170 such that at least a portion of filtered beam of light 160 is provided to PD 110 by sample 170. In other words, in optical device 200, light is provided to sample 170 after filtering by narrowband optical filter 106. However, in some implementations, optical device 100 may be configured such that light is provided to sample 170 before filtering by narrowband optical filter 106. In other words, in some implementations, narrowband optical filter 106 may be arranged to receive beam of light 150 after interaction with sample 170, an example of which is shown in FIG. 3.

Figure 3:
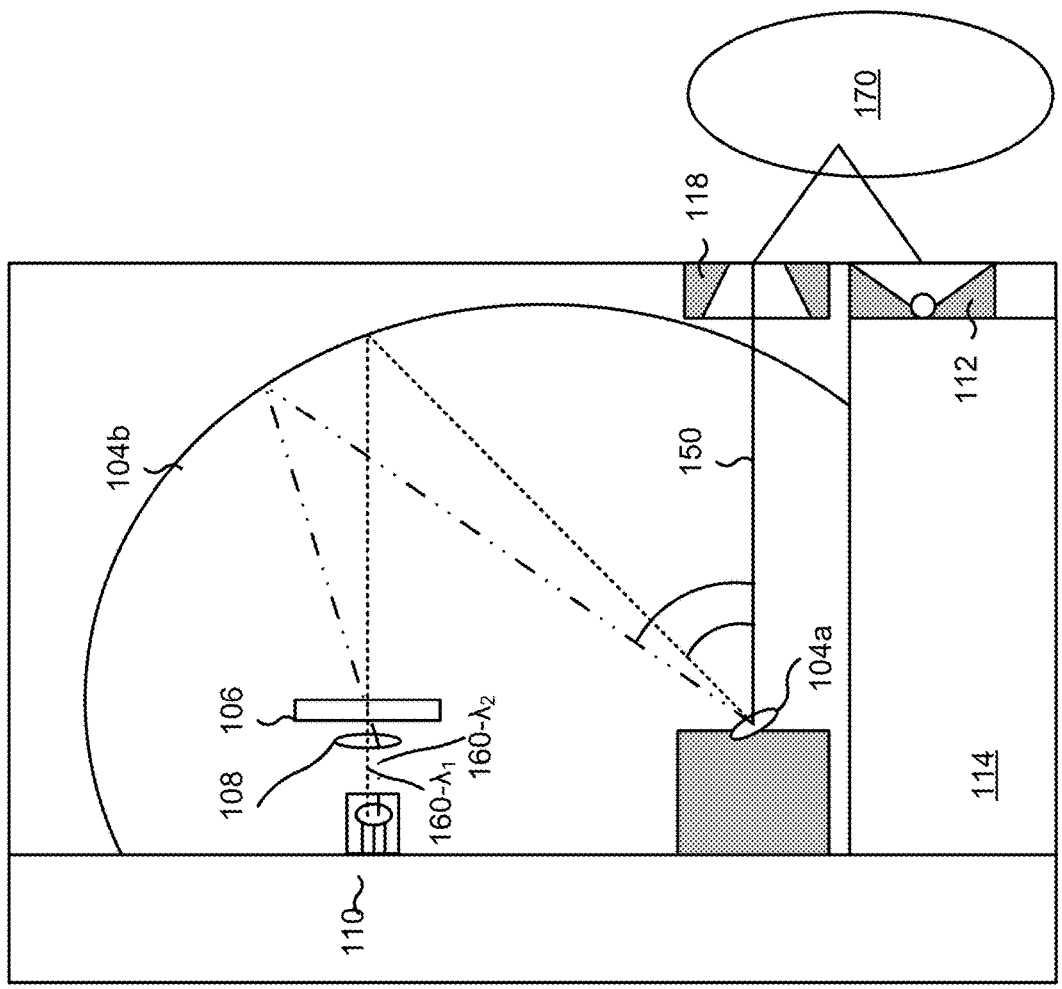

FIG. 3 is a diagram of an example implementation 300 of optical device 100. As shown in FIG. 3, example implementation 300 of optical device 100 (herein referred to as optical device 300) includes steering element 104 (comprising MEMS mirror 104a and concave elliptical mirror 104b), narrowband optical filter 106, optics 108, PD 110, emitter 112, electronics housing 114, and collimating element 118.

Collimating element 118 includes an optical element to collimate light received at collimating element 118. In some implementations, as shown in FIG. 3, collimating element 118 is arranged to collimate light, after interaction with by sample 170, in order to create beam of light 150.

At a first time of operation of optical device 300, assume that optical device 300 is to collect spectral data associated with wavelength $\lambda_1$. As shown in FIG. 3, emitter 112 emits a beam of light toward sample 170. Here, sample 170 reflects a portion of the beam of light emitted by emitter 112 to collimating element 118. Collimating element 118 collimates the beam of light, received from sample 116, in order to form beam of light 150, and sends beam of light 150 to MEMS mirror 104a.

Here, as shown by the dotted line in FIG. 3, MEMS mirror 104a is tilted at an angle such that beam of light 150, after being reflected by concave elliptical mirror 104b, is incident on narrowband optical filter 106 at an angle that causes narrowband optical filter 106 to transmit filtered beam of light 160 comprising light at wavelength $\lambda_1$. This angle is shown as normal incidence in FIG. 3.

As further shown, narrowband optical filter 106 may filter beam of light 150 in order to create filtered beam of light 160 comprising light at wavelength $\lambda_1$ (herein referred to as filtered beam of light 160-$\lambda_1$), and may output filtered beam of light 160-$\lambda_1$ toward optics 108. Optics 108, having received filtered beam of light 160-$\lambda_1$ focuses filtered beam of light 160-$\lambda_1$ at PD 110. PD 110 receives filtered beam of light 160-$\lambda_1$ and collects spectral data, accordingly. For example, PD 110 may provide an electrical signal, associated with an intensity of $\lambda_1$, to one or more devices included in (or external to) electronics housing 114.

As further shown in FIG. 3, at a second time of operation of optical device 300, optical device 300 may need to collect spectral data associated with wavelength $\lambda_2$. As shown, emitter 112 emits a beam of light toward sample 170, sample 170 reflects a portion of the beam of light emitted by emitter 112 to collimating element 118, collimating element 118 collimates the beam of light in order to form beam of light 150, and outputs beam of light 150 to MEMS mirror 104a. Here, as shown by the dashed and dotted line in FIG. 3, MEMS mirror 104a is tilted at an angle such that beam of light 150, after being reflected by concave elliptical mirror 104b, is incident on narrowband optical filter 106 at an angle that causes narrowband optical filter 106 to transmit filtered beam of light 160 comprising light at wavelength λ2. This angle is shown as an angle other than normal incidence in FIG. 3.

As further shown, narrowband optical filter 106 may filter beam of light 150 in order to create filtered beam of light 160 comprising light at wavelength λ2 (herein referred to as filtered beam of light 160-$\lambda_2$), and may output filtered beam of light 160-$\lambda_2$ toward optics 108. Optics 108, having received filtered beam of light 160-$\lambda_2$ focuses filtered beam of light 160-$\lambda_2$ at PD 110. PD 110 receives filtered beam of light 160-$\lambda_2$ and collects spectral data, accordingly. For example, PD 110 may provide an electrical signal, associated with an intensity of $\lambda_2$, to one or more devices included in (or external to) electronics housing 114.

The number and arrangement of elements shown in FIG. 3 are provided as examples. In practice, there may be additional elements, fewer elements, different elements, or differently arranged elements than those shown in FIG. 3. Furthermore, two or more elements shown in FIG. 3 may be implemented within a single element, or a single element shown in FIG. 3 may be implemented as multiple, distributed elements.

In some implementations of optical device 100, steering element 104 may include an emitter 104, where emitter 104 is one of a plurality of emitters 104, each being arranged to emit a respective beam of light at a different angle with respect to narrowband optical filter 106. In such a case, optical device 100 may not require any movable parts (e.g., such as MEMS mirror 104a, which may improve reliability or lifetime of optical device 100. An example of such an optical device 100 is shown in FIG. 4.

Figure 4:
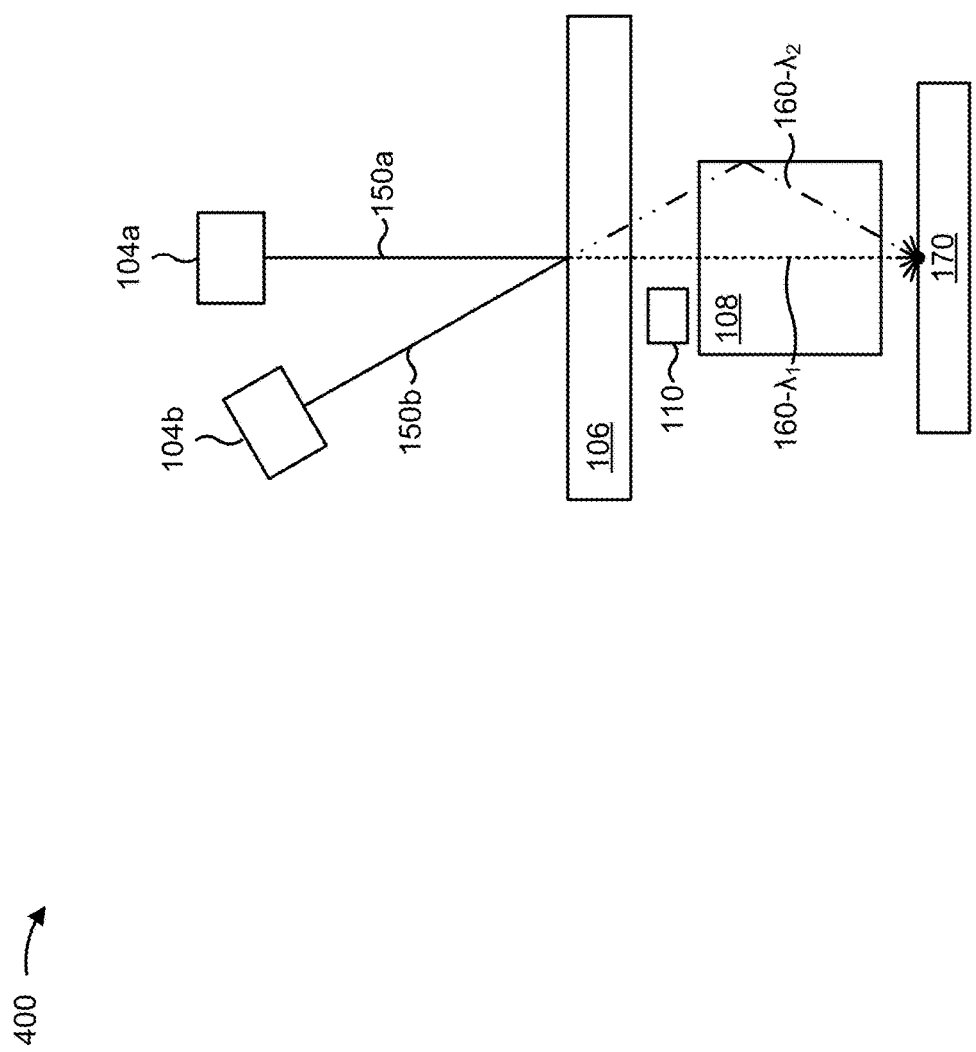

FIG. 4 is a diagram of an example implementation 400 of optical device 100. As shown in FIG. 4, example implementation 400 of optical device 100 (herein referred to as optical device 400) includes steering element 104 (comprising a plurality of emitters 104, including emitter 104a and emitter 104b), narrowband optical filter 106, optics 108, and PD 110.

Emitters 104 include a plurality of emitters, each arranged to emit a respective beam of light 150 at a different particular angle with respect to narrowband optical filter 106. In some implementations, an emitter 104, included in the plurality of emitters 104, may include an LED configured to emit a collimated beam of light. In some implementations, emitters 104 may be arranged such that beams of light 150, emitted by respective emitters 104, are incident on narrowband optical filter 106 at different angles. For example, emitters 104 may be arranged in an arc, a dome arrangement, a hemispherical arrangement, and/or the like. In some implementations, emitters 104 may be controlled by one or more devices included in electronics housing 114 (not shown).

At a first time of operation of optical device 400, assume that optical device 400 is to collect spectral data associated with wavelength $\lambda_1$. As shown in FIG. 4, emitter 104a emits beam of light 150a such that beam of light 150a is incident on narrowband optical filter 106 at a first particular angle (e.g., normal incidence in FIG. 4). At the first time of operation, emitter 104b is not emitting light. As shown by the dotted line in FIG. 4, beam of light 150a is incident on narrowband optical filter 106 at an angle that causes narrowband optical filter 106 to transmit filtered beam of light 160 comprising light at wavelength $\lambda_1$.

As further shown, narrowband optical filter 106 may filter beam of light 150a in order to create filtered beam of light 160 comprising light at wavelength $\lambda_1$ (herein referred to as filtered beam of light 160-$\lambda_1$), and may output filtered beam of light 160-$\lambda_1$ toward optics 108. In optical device 400, optics 108 includes a light pipe arranged to direct filtered beams of light 160 to sample 170. As further shown, sample 170 interacts with filtered beam of light 160-$\lambda_1$ such that a portion of filtered beam of light 160-$\lambda_1$ received, via optics 108, at PD 110. PD 110 receives the portion of filtered beam of light 160-$\lambda_1$ and collects spectral data, accordingly.

As further shown in FIG. 4, at a second time of operation of optical device 400, optical device 400 may need to collect spectral data associated with wavelength $\lambda_2$. As shown in FIG. 4, emitter 104b emits beam of light 150b such that beam of light 150b is incident on narrowband optical filter 106 at a second particular angle (e.g., an angle that is not normal incidence in FIG. 4). At the second time of operation, emitter 104a is not emitting light. As shown by the dotted and dashed line in FIG. 4, beam of light 150b is incident on narrowband optical filter 106 at an angle that causes narrowband optical filter 106 to transmit filtered beam of light 160 comprising light at wavelength $\lambda_2$.

As further shown, narrowband optical filter 106 may filter beam of light 150b in order to create filtered beam of light 160 comprising light at wavelength $\lambda_2$ (herein referred to as filtered beam of light 160-$\lambda_2$), and may output filtered beam of light 160-$\lambda_2$ toward optics 108. As shown, sample 170 interacts with filtered beam of light 160-$\lambda_2$ such that a portion of filtered beam of light 160-$\lambda_2$ received, via optics 108, at PD 110. PD 110 receives the portion of filtered beam of light 160-$\lambda_2$ and collects spectral data, accordingly.

The number and arrangement of elements shown in FIG. 4 are provided as examples. In practice, there may be additional elements, fewer elements, different elements, or differently arranged elements than those shown in FIG. 4. Furthermore, two or more elements shown in FIG. 4 may be implemented within a single element, or a single element shown in FIG. 4 may be implemented as multiple, distributed elements.

FIG. 5 is a flow chart of an example process 500 for using optical devices 100, 200, 300, and/or 400 in order to provide a selected wavelength of light to a photodiode. In some implementations, one or more process blocks of FIG. 5 may be performed by one or more elements of an optical device (e.g., optical device 100, optical device 200, optical device 300, optical device 400, and/or the like).

As shown in FIG. 5, process 500 may include receiving, by a narrowband optical filter included in an optical device, a beam of light at a selected angle of incidence, wherein the beam of light is caused to be received by the narrowband optical filter at the selected angle of incidence by a steering element included in the optical device (block 510). For example, narrowband optical filter 106 may receive a beam of light 102 at a selected angle of incidence, wherein the beam of light is caused to be received by narrowband optical filter 106 at the selected angle of incidence by steering element 104, as described above.

As shown in FIG. 5, process 500 may include outputting, by the narrowband optical filter, a filtered beam of light associated with the beam of light, wherein a wavelength of the filtered beam of light is governed by the selected angle of incidence (block 520). For example, narrowband optical filter 106 may output a filtered beam of light associated with the beam of light, wherein a wavelength of the filter beam of light is governed by the selected angle of incidence, as described above.

As shown in FIG. 5, process 500 may include receiving, by a photodiode included in the optical device, a portion of the filtered beam of light after the filter beam of light is outputted by the narrowband optical filter (block 530). For example, PD 110 may receive a portion of the filtered beam of light after the filter beam of light is outputted by narrowband optical filter 106, as described above.

Process 500 may include additional implementations, such as any single implementations or any combination of implementations described below and/or described herein.

In some implementations, narrowband optical filter 106 includes an ultra-narrowband optical filter.

In some implementations, steering element 104 includes a micro-electro-mechanical system (MEMS) mirror 104a. In some implementations, steering element 104 includes a set of curved reflective optical elements.

In some implementations, narrowband optical filter 106 is arranged to send the filtered beam of light to sample 170 such that the portion of the beam of light is provided to PD 110 by sample 170.

In some implementations, narrowband optical filter 106 is arranged to receive the beam of light after interaction with sample 170. In some implementations, the optical device may include collimating element 118 to send the beam of light to steering element 104.

In some implementations, the optical device may include an emitter 112 to emit the beam of light.

In some implementations, steering element 104 includes emitter 104 that emits the beam of light, wherein emitter 104 is one of a plurality of emitters 104, each being arranged to emit a respective beam of light at a different angle with respect to narrowband optical filter 106. In some implementations, the optical device may include light pipe 120 to direct the filtered beam of light to sample 170.

In some implementations, the optical device may be a spectrometer or another type of optical sensor.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations described herein provide an optical device (e.g., optical device 100, optical device 200, optical device 300, optical device 400) that includes a single photodiode 110 and narrowband optical filter 106, where an angle of incidence of a beam of light (e.g., a collimated light source) on narrowband optical filter 106 is controlled by steering element 104, thereby determining a wavelength of light transmitted by narrowband optical filter 106 to or from sample 170 and into the single photodiode 110.

The foregoing disclosure provides illustration and description, but is not intended to be exhaustive or to limit the implementations to the precise form disclosed. Modifications and variations are possible in light of the above disclosure or may be acquired from practice of the implementations.

For example, while the techniques and apparatuses described herein are described in terms of optical devices 100 used for optical sensing, these techniques and apparatuses may be used in other types of optical devices, such as an illumination source capable of emitting light at a selected wavelength based on filtering by narrowband optical filter 106. In such a case, the illumination source may include an arrangement of elements similar to that shown in FIG. 3, except that emitter 112 would replace PD 110, and no PD 110 would be included in the device.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical device, comprising:
a narrowband optical filter to:
receive a beam of light at a selected angle of incidence,
wherein the beam of light is caused to be received by the narrowband optical filter at the selected angle of incidence by a steering element included in the optical device; and
output a filtered beam of light associated with the beam of light,
wherein a wavelength of the filtered beam of light depends on the selected angle of incidence of the beam of light on the narrowband optical filter;
a photodiode to receive at least a portion of the filtered beam of light after the filtered beam of light is outputted by the narrowband optical filter; and
a light pipe to direct the filtered beam of light to a sample.

2. The optical device of claim 1, wherein the narrowband optical filter is an ultra-narrow bandpass (UNBP) filter.

3. The optical device of claim 1, wherein the steering element includes a micro-electro-mechanical system (MEMS) mirror.

4. The optical device of claim 1, wherein the steering element includes a set of curved reflective optical elements.

5. The optical device of claim 1, wherein the narrowband optical filter is arranged to send the filtered beam of light to the sample such that at least a portion of the beam of light is reflected or transmitted to the photodiode by the sample.

6. The optical device of claim 1, wherein the narrowband optical filter is arranged to receive the beam of light after reflection or transmission by the sample.

7. The optical device of claim 6, further comprising a collimating element to send the beam of light to the steering element.

8. The optical device of claim 1, further comprising an emitter to emit the beam of light.

9. The optical device of claim 1, wherein the steering element includes an emitter that emits the beam of light,
wherein the emitter is one of a plurality of emitters, each being arranged to emit a respective beam of light at a different angle with respect to the narrowband optical filter.

10. The optical device of claim 1, wherein the optical device is a spectrometer.

11. A method, comprising:
receiving, by a narrowband optical filter included in an optical device, a beam of light at a selected angle of incidence,
wherein the beam of light is caused to be received by the narrowband optical filter at the selected angle of incidence by a steering element included in the optical device, and
wherein the steering element includes a micro-electromechanical system (MEMS) mirror and one or more curved reflective optical elements;
outputting, by the narrowband optical filter, a filtered beam of light associated with the beam of light,
wherein a wavelength of the filtered beam of light is governed by the selected angle of incidence; and
receiving, by a photodiode included in the optical device, a portion of the filtered beam of light after the filter beam of light is outputted by the narrowband optical filter.

12. The method of claim 11, wherein the photodiode receives the portion of the filtered beam of light after the filter beam of light interacts with a sample.

13. The method of claim 11, wherein the narrowband optical filter is an ultra-narrow bandpass (UNBP) filter.

14. The method of claim 11, wherein the one or more curved reflective optical elements include a set of curved reflective optical elements.

15. The method of claim 11, further comprising an emitter to emit the beam of light.

16. A spectrometer, comprising:
a steering element comprising:
a micro-electro-mechanical system (MEMS) mirror to reflect a beam of light, and
a curved reflective optical element to direct the beam of light such that the beam of light is incident on a narrowband optical filter at a particular angle of incidence;
the narrowband optical filter to filter the beam of light in order to create a filtered beam of light, wherein a wavelength of the filtered beam of light depends on the particular angle of incidence; and
a photodiode to receive at least a portion of the filtered beam of light.

17. The spectrometer of claim 16, wherein the narrowband optical filter is an ultra-narrow bandpass interference (UNBP) filter.

18. The spectrometer of claim 16, further comprising an emitter to emit the beam of light.

19. The spectrometer of claim 16, wherein the curved reflective optical element is a concave elliptical mirror.

20. The spectrometer of claim 16, wherein the MEMS mirror includes a tiltable mirror.

21. The spectrometer of claim 16, wherein the MEMS mirror includes a movable mirror.

* * * * *